United States Patent

Denny

[15] 3,637,087
[45] Jan. 25, 1972

[54] JOINT STRUCTURE
[72] Inventor: Denny A. Denny, Dallas, Tex.
[73] Assignee: Midland Machine Corporation, Elizabeth, N.J.
[22] Filed: Oct. 30, 1967
[21] Appl. No.: 678,819

[52] U.S. Cl. ........................................................211/176
[51] Int. Cl. ...............................................................A47f 5/10
[58] Field of Search..................287/189.36, 54 C; 211/176, 211/177, 148; 108/107

[56] References Cited

UNITED STATES PATENTS

| 2,869,731 | 1/1959 | Axelrod | 211/148 |
| 2,992,744 | 7/1961 | Fohn | 211/148 |
| 3,352,584 | 11/1967 | Engel | 287/189.36 |

FOREIGN PATENTS OR APPLICATIONS

| 646,587 | 7/1964 | Belgium | 287/54 C |
| 380,324 | 9/1964 | Switzerland | 211/148 |

Primary Examiner—Edward C. Allen
Attorney—E. Hastings Ackley and Walter J. Jagmin

[57] ABSTRACT

A joint structure between a supported member and a supporting member including a tongue on one of the members, a tongue-receiving slot in the other of the members, lateral complementary mating load bearing surfaces on the tongue and along an edge of the slot, and a removable locking retainer engageable with the members for holding them against disengagement from each other.

23 Claims, 12 Drawing Figures

INVENTOR
Denny A. Denny

INVENTOR
Denny A. Denny

JOINT STRUCTURE

This invention relates to a joint structure and it particularly relates to devices for joining supporting and supported members of structures such as shelf racks, scaffolding, and the like.

It is a particularly important object of the invention to provide a new and improved joint for connecting a supporting member and a supported member in a relation providing maximum rigidity.

It is another object of the invention to provide a joint for connecting a supporting and a supported member including a tongue in one member and a tongue receiving slot in the other, the tongue and slot having complementary mating load-bearing surface portions to provide maximum rigidity, to minimize twisting or tilting, and for increasing the load-bearing area of the members to reduce shear forces between the members tending to tear them at the tongue and slot.

It is an especially important object of the invention to provide a joint structure of the character described wherein the tongue and slot load-bearing surfaces are of predetermined nonlinear configuration whereby a seated relationship is provided between the surfaces across the full width of the tongue and slot at the surfaces to reduce twisting or turning between the members.

It is still a further object of the invention to provide a joint of the character described having a locking retainer engageable between the members for releasably locking them against disengagement from each other.

It is another object of the invention to provide joint structure of the character described wherein the tongue fits closely in the tongue receiving slot thereby reducing possible movement between the supporting and supported members to provide a joint of maximum rigidity.

It is another especially important object of the invention to provide a joint of the character described having nonlinear complementary load-bearing surfaces on the tongue and slot which fully engage each other across the full width of the tongue and the slot surfaces to improve the rigidity and load distribution characteristics of the joint.

It is still a further object of the invention to provide a joint of the character described wherein one form of the nonlinear complementary surfaces includes arcuate central portions, and another form of the surfaces includes angular or V-shaped central portions for improving the rigidity of the connection between the members by reducing possible twisting or tilting.

It is still a further object of the invention to provide joint structure of the character described wherein one of the members is provided with a plurality of spaced tongue receiving slots while the other member has a plurality of correspondingly spaced tongues for maximum distribution of load forces applied between the members.

It is a still further object of the invention to provide a rack structure, as for shelving and the like, including substantially vertical supporting members and substantially horizontal supported members connected by joints of the character described whereby the rigidity of the rack is improved and tilting of the rack and twisting between the vertical and horizontal members is minimized.

A further object is to provide in a structure of the character described a supporting member having a plurality of spaced slots adapted to receive the tongue members of supported members, whereby a plurality of supported members may be connected to a supporting member at spaced positions thereon, or the location of a single supported member may be varied.

Still another object is to provide a structure having a plurality of laterally spaced supporting members and a plurality of vertically spaced supported members, each of said members being joined by the joint structure of this invention.

It is another object of the invention to provide a joint structure for releasably coupling a supporting and a supported member including a lock member for holding the coupled members in the interlocked relationship.

Additional objects and advantages of the invention will be readily apparent from the reading of the following description of a device constructed in accordance with the invention, and reference to the accompanying drawings thereof, wherein.

Figure 1:
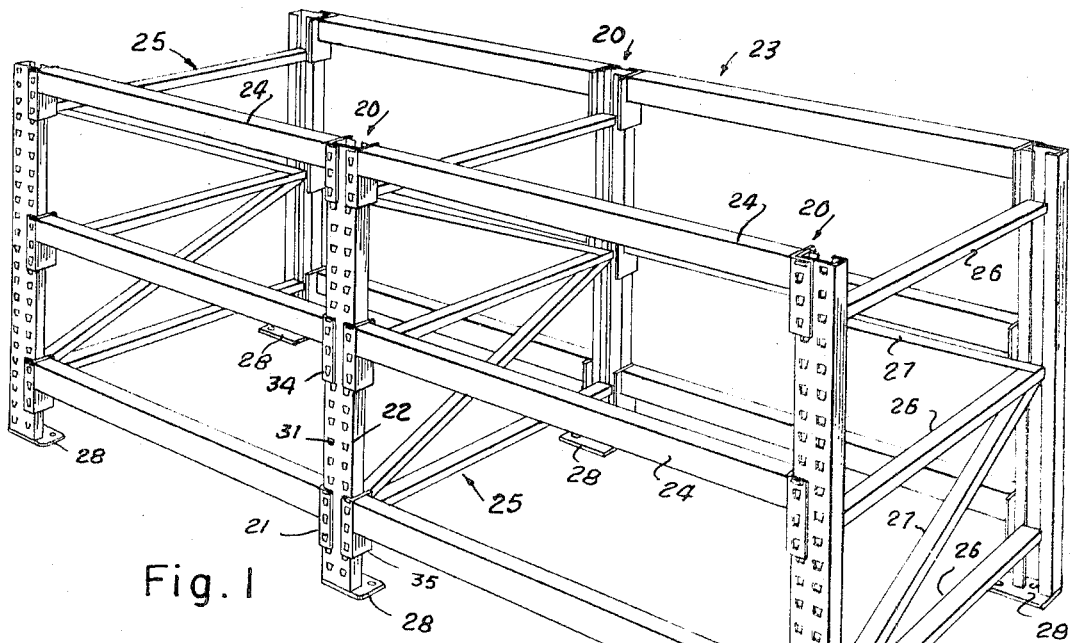
FIG. 1 is a perspective view of a shelf rack or the like having supported members joined to supporting members by joint structure embodying the invention.

Referring to the drawings, structural joints 20 embodying the invention and including a supported bracket 21 and a supporting channel member of column 22 are used in a rack 23 or similar structure, FIG. 1, for securing horizontal supported member 24 in releasable supported relationship between truss units 25 formed by two of the columns interconnected by horizontal and angle braces 26 and 27, respectively, and supported on foot plates 28. The bracket 21 has a plurality of longitudinally spaced tongues 30 which are received in corresponding longitudinally spaced slots 31 in the column for coupling the bracket to and supporting it from the column. The bracket is releasably locked to the column by a retainer or locking member 32 inserted through a locking slot 33 in the bracket above the top tongue and into and through the corresponding column slot 31 immediately behind the locking slot and through which the top tongue is disposed. As described in detail hereinafter, in accordance with the invention the tongue and column slots have mating load-bearing surfaces of nonlinear configuration to distribute the load on the bracket and minimize load concentrations.

The bracket or supported member 21 is of angular cross section with a front plate 34 and a sideplate 35. The front plate of the bracket is disposed along the front face 40 of the front panel or web 41 of the channel-shaped column 22. The sideplate 35 of the bracket extends along a side panel 42 of the column. For rigidity, the column 22 has longitudinal back flanges 22a. The tongues 30 are longitudinally aligned and spaced along the backface 34a of the front plate 34 of the bracket. The slots 31 are spaced, sized, and aligned in the front panel of the column to correspond with and receive the tongues of the bracket.

Each of the tongue slots 31 formed in the front panel of the column is defined by an upper transverse or horizontal edge surface 43 connecting downwardly convergent upper side surfaces 44 which join lower vertical side surfaces 45. The bottom horizontal or transverse load-bearing edge surface of the slot is formed by horizontal lateral edge surface portions 46 and a circular or arcuate, concave, central surface portion 50. Two rows of lateral spaced slots 31 are provided in the column as illustrated for supporting horizontal members extending from opposite sides of the column such as is illustrated in the case of the center column in the rack of FIG. 1. It will be obvious that where corner columns are concerned only one row of these slots 31 are required.

Figures 2, 3, 4:
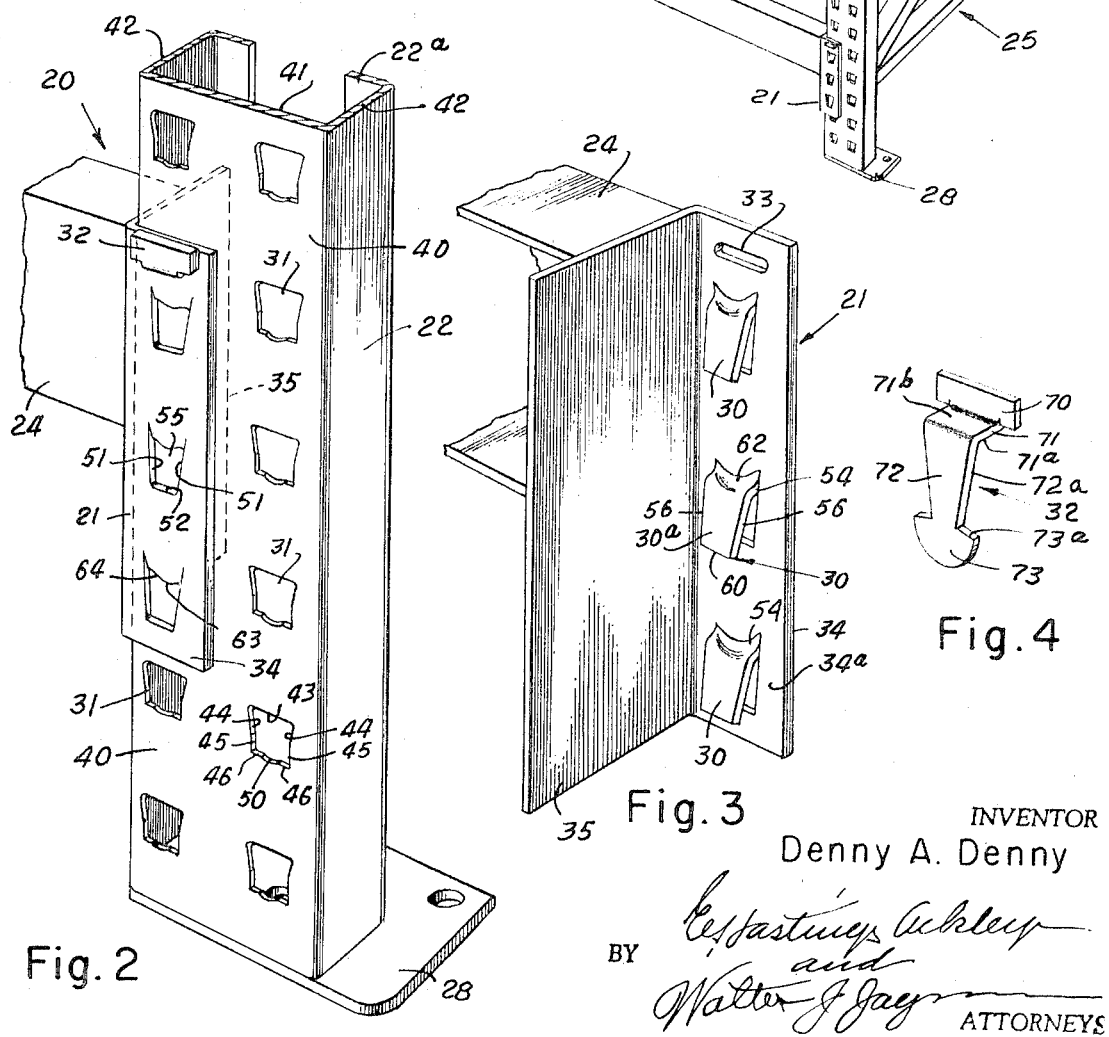
FIG. 2 is an enlarged fragmentary view in perspective of one of the joints of the rack of FIG. 1 showing a supported bracket at the end of one of the supported members and a portion of a supporting vertical column connected thereto in the rack in FIG. 1.
FIG. 3 is a further enlarged perspective view showing the inside or back faces of one of the supported brackets used on the end of the supported members in the rack shown in FIG. 1.
FIG. 4 is a view in perspective of the back of a locking retainer for locking the supported bracket with the supporting vertical column.
Figure 5:
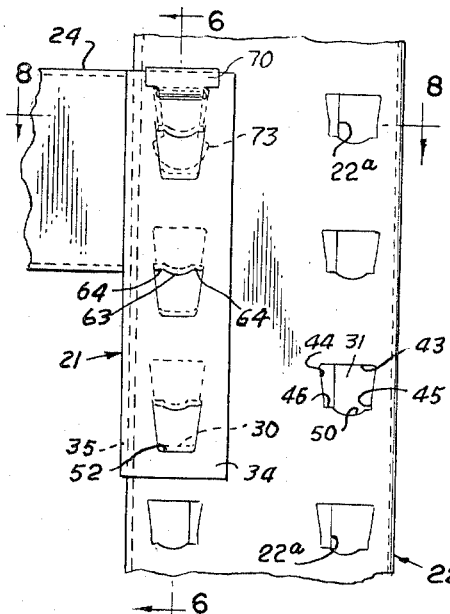
FIG. 5 is an enlarged fragmentary front elevation of one of the supported brackets and a portion of a supporting post of one of the shelf support members in the rack of FIG. 1.
Figure 6:
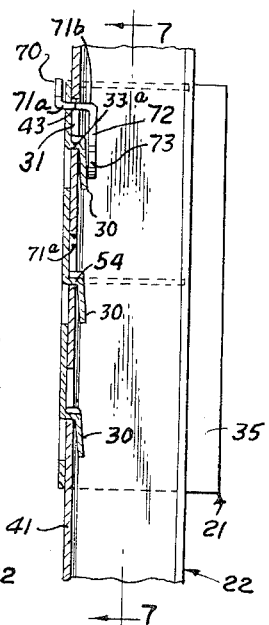
FIG. 6 is a vertical sectional view taken along the line 6—6 of FIG. 5.
Figure 7:
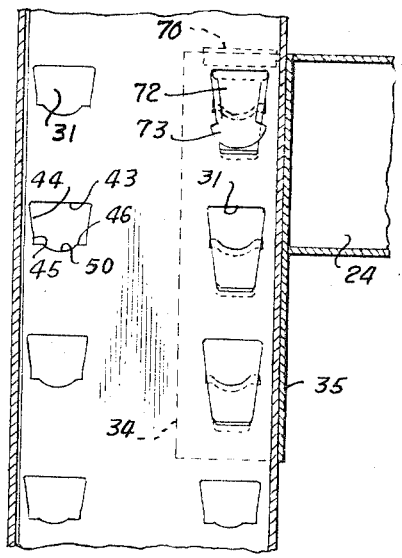
FIG. 7 is a vertical sectional view taken along the line 7—7 of FIG. 6.
Figure 8:
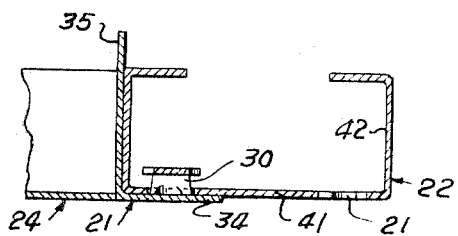
FIG. 8 is a view in section taken along the line 8—8 of FIG. 5.
Figure 9:
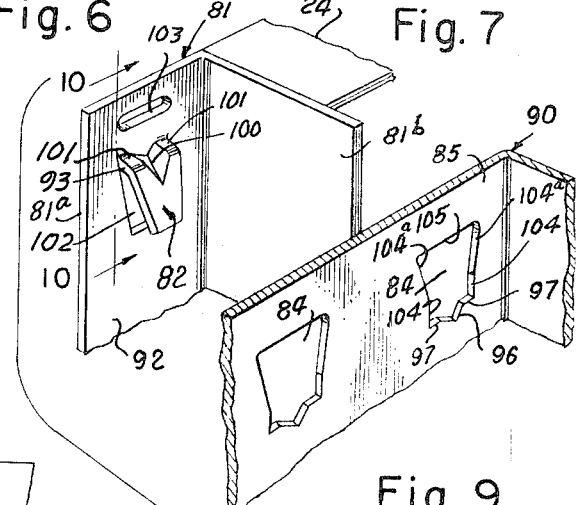
FIG. 9 is a fragmentary perspective view of a modified joint structure embodying the invention showing a supported bracket in separated relation to a supporting column.
Figure 11:
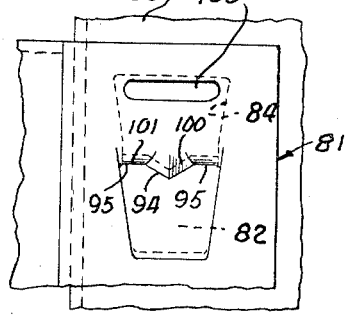
FIG. 11 is a fragmentary front elevation of the joint of FIG. 9 showing the members in assembled relationship; and, FIG. 12 is a fragmentary back view partly in section of the assembled members of the joint illustrated in FIGS. 9 and 11.
Figure 10:
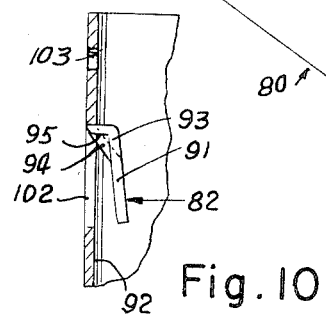
FIG. 10 is a fragmentary sectional view taken along the line 10—10 of FIG. 9.
Figure 12:
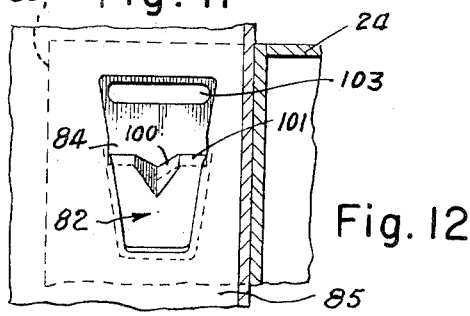

The tongues 30 of the brackets 21 are formed integral with the font plate 34 of the bracket by stamping the plate, cutting it along downwardly convergent side edges 51 and along a bottom horizontal or transverse edge 52 (FIG. 2) and pressing the tongue inwardly or backwardly from the backface 34a of the front bracket plate (FIG. 3) leaving the tongue body portion 30a connected with the plate across a transverse top juncture portion 54, while the side edge surfaces 51 and bottom surface 52 define a slot 55 in the bracket plate where the material forming the tongue has been removed therefrom. Each tongue is downwardly tapered having downwardly convergent side edge surfaces 56 joining a horizontal lower end edge surface 60. A connecting rearwardly extending upper end portion of the tongue forms the juncture 54 between the tongue body portion 34a and the plate 34 of the bracket. The upper and lower lateral face portions of the juncture portion of the tongue are substantially horizontal in a direction perpendicular to the plate 34 with the tongue body portion 30a sloping longitudinally of and diverging from the backface of the plate, (FIGS. 3 and 6). In a lateral direction the tongue juncture portion 54 has a top concave central surface portion 62 with a corresponding bottom convex central load-bearing surface portion 63 which is complementary to or conforms substantially to the curvature of the central surface portion 50 of the bottom load-bearing edge of the slots 31. The outer edge portions 64 (FIG. 5) of the lower load-bearing surface of the tongue juncture portion on opposite sides of the central surface portion are substantially horizontal to conform to the lower outer edge portions 46 of the slots 31. When a tongue is seated in a slot 31, as shown in FIG. 5, the lower face of the juncture portion of the tongue is seated on the lower edge surface of the slot substantially across its entire width. The central convex arcuate surface 63 of the tongue juncture portions seats in the central concave slot surface 50 and the horizontal lateral juncture surface portions 64 seat on the corresponding lateral bottom edge slot surfaces 46. The mating of the tongue and column slot surfaces provides a support with maximum engagement and stability and distributes the load forces transmitted from the bracket tongues to the edge surfaces of the column slots to a maximum extent, thereby minimizing shear forces applied to the columns at the corners of the lower portions of the slots 31, which, in other forms of similar locking devices tends to tear the material forming the tongue and the web 41 of the column at the lower slot corners.

The shaping of each of the tongues to form the central concave-convex juncture portions 54 draws the lateral edge portion of the tongue along the juncture portion laterally inwardly toward each other, thereby reducing the overall width of the tongue at the juncture which facilitates entry of the tongue into the slot 31, and such lateral edge portions of the tongue juncture portion closely engage the narrow lower vertical portions of the slots 31 between the edge surfaces 45, minimizing the lateral looseness or tolerance between the bracket and column of the joint, when the tongues are fully engaged in the column slots.

The bracket 21 is locked in supported relationship with the column 22 by the retainer 32, FIG. 4, which has a transverse bar 70 at its upper end on a horizontal narrower offset portion 71 from which a tapered body portion 72 extends downwardly to an enlarged, substantially semicircular, foot portion 73 which is larger in diameter or lateral width than the width of the locking slot 33, thereby requiring that one lateral edge of the curved portion 73 be inserted into the slot first, followed by turning the foot and body portion of the retainer away from the face of the bracket plate to fully insert the retainer through the slot. As illustrated in FIG. 6, when the retainer 32 is inserted through the slot 33 of the bracket and a slot 31 of the column, the bar 70 of the retainer is disposed laterally across the front face of the bracket plate 34, the offset portion 71 extends horizontally through the slot 33 and the upper portion of the aligned slot 31, while the downwardly extending body portion 72 and the foot 73 project in overlapping relationship along the uppermost tongue 30.

When the retainer 32 is disposed in locking relationship through the locking slot 33 of the bracket 21 and the upper end portion of a corresponding vertically aligned column slot 31, as shown in FIG. 6, a front portion of the lower face 71a of the offset portion 71 of the retainer engages the lower edge surface 33a of the slot 33 while the upper edge surface 43 of the column slot is engageable with a middle portion of the top face 71b of the offset portion of the retainer. An upward force on the bracket 21 forces the lower edge of the slot 33 upwardly against the lower face of the retainer offset portion 71 with the offset portion being forced upwardly against the upper edge 43 of the column slot applying a clockwise turning force or movement to the retainer, as viewed in FIG. 6, so that it is wedged more tightly between the column and bracket with the foot portion 73 of the retainer pressing more tightly against the top tongue of the bracket immediately below the retainer. The wedging action of the offset portion of the retainer between the bracket and the column slot surfaces prevents upward movement of the bracket along the column thereby locking the bracket in supported relationship on the column.

In assembling a structure such as the rack 23 including joint structures embodying the invention between the supporting members of the structure such as the horizontal members 24 supported by the vertical columns 22, the trusses 25 having the footplates 28 are disposed in longitudinal spaced relation. Each member 24 with its end bracket 21 is supported at the desired height along the front face of and between the pair of columns 22 to which the brackets are to be attached. Each bracket is supported with its front plate 34 along the front face 40 of the web 41 of a column generally overlying the slots 31 into which the tongues 30 of the bracket are to be inserted. The sideplate 35 is disposed along the side panel 42 of the column. The lower inside edges of the lower end edge surfaces 60 on the tongues are preferably held in engaging relationship with the front face of the web 41 either above or below the corresponding slots 31 into which the tongues are to be inserted. The bracket is moved upwardly or downwardly as necessary to align the tongues in the bracket with the corresponding slots in the column, preferably with the lower end portions of the tongues disposed sufficiently above the lower edge surfaces of the slots that the tongues may be freely inserted through the slots. The bracket is moved rearwardly toward the front face 41 of the column until the lower end portions of each of the tongues are inserted through the corresponding slots far enough that the lower edge surfaces 60 of the tongues have passed completely through the slots and are positioned behind the backface of the web 41. The bracket is lowered relative to the column with the tongues moving downwardly along the backface of the web until the bottom convex and horizontal lateral surface portions of the juncture portion 54 of each tongue engages or seats on the conforming concave and horizontal straight lateral edge supporting surfaces 50 and 46 of the corresponding column slot 31.

The brackets and members connected thereto are rigidly supported by the columns with which the brackets are coupled. The conformity between the lower load-bearing surface portions of the juncture portion 54 of each tongue with the lower edge load-bearing surface portions of the corresponding column slots provides full lateral seated relationship between the tongues and their respective slot edge surfaces so that the load being supported by each bracket is evenly distributed along and applied to the column through the engagement of the entire width of the lower surface of the juncture portion 54 of the tongue with the upwardly facing supporting edge surfaces 46 and 50 at the lower end of the column slots. Any tendency for shear forces to tear the material at the edges of the column slots or of the tongues is minimized.

Each of the tongues across its juncture portion fits tightly between the opposed vertical edges 45 defining the lower end portion of the corresponding column slot to limit lateral movement of the tongue in the slot. The combined effect of the fully seated relationship and the extended substantially planar area in engagement and the close fit of the juncture portions of each tongue in its column slot provides a substantially rigid support relationship between the supporting column and the supported bracket.

As each joint 20 is assembled in the rack, the bracket may be locked in place on the column by means of the retainer 32. The retainer is held in front of the bracket with the body and foot portions 72 and 73 in a plane perpendicular to and aligned with the locking slot 33, and one of the body edges about parallel with the face of the front plate 34 of the bracket so that a laterally projecting portion 73a of the foot portion 73 is inserted sideways into the slot. The sideway of the foot portion of the retainer is necessary as its diameter or width is greater than the width of the locking slot. Also, the offset portion 71 and the bar 70 of the retainer must extend downwardly along the front face of the bracket as the retainer is inserted so that they are in position when the retainer is fully inserted through the slot for the foot and body portion to project downwardly along the backface of the column web. The retainer is manipulated through the slot and turned downwardly as the angle of juncture between the body portion and the offset portion 71 of the retainer passes through the locking slot. As already discussed, at the final position of the retainer its foot and body portion overlap the backface of the tongue 30 immediately below the retainer with the offset portion being disposed horizontally through the slot 33 and the backface of the bar 70 being seated against the front face of the bracket plate 34 over the locking slot. The retainer holds the bracket against vertical movement due to the wedging action of the offset portions 71 of the retainer between the lower edge surface 33a of the slot 33 and the upper edge surface 43 of the corresponding column slot. So long as the retainer is so positioned the bracket cannot be lifted vertically or removed from its supported relationship on the column, and the wide foot portion of the retainer prevents accidental displacement or disengagement of the retainer from the locking slot, so that the bracket and column are locked together against inadvertent separation by the retainer.

When disassembly of the rack is desired, each bracket 30 is released from its locked relationship on its supporting column by disengaging the retainer 32 from the bracket and the column. The retainer is grasped by the bar 70 and pulled forward from the front face of the bracket until the angular juncture between the offset portion 71 and body portion 72 of the retainer is maneuvered through the locking slot 33. The body portion 72 is then withdrawn through the slot until the foot portion 73 is adjacent to the backface of the web of the column. The retainer is then turned sideways until first the laterally projecting portion 73a and then the remainder of the foot portion may be withdrawn through the locking slot. After the retainer is removed, the bracket 21 is lifted upwardly and forwardly from the front face of the column until the tongues 30 are withdrawn from the column slots 31 thereby fully disengaging the bracket from the column.

The supported bracket 21 is movable to any desired supported position along the length of the supporting column so that shelf height and other structural height adjustments are readily made in any structure having the connecting devices or joints of the invention. The movement of the bracket from one height to another is carried out by following the already discussed procedures of disengagement of the bracket from the column and subsequent reengagement of the tongues of the bracket with the slots of the column. Due to the rigidity and close engagement of the coupling between the bracket and its supporting column, it is preferred when securing members such as the truss members 25 of the rack 20 with their supporting columns that the joints between the columns and the brackets at the opposite ends of the support members be made substantially simultaneously. Therefore, while some flexibility of the support member 25 may allow some latitude in maneuvering the bracket, generally it is preferred that the tongues on the brackets at the opposite ends of such a member be simultaneously inserted into the respective corresponding slots of the supporting columns.

It will now be seen that a new and improved joint structure for releasably coupling supported and supporting members has been described and illustrated and that the joint includes a tongue on one of the members and a tongue-receiving slot in the other of the members, the tongue and tongue-receiving slot each having complementary load-bearing surface portions which are engaged with each other when the members are in coupled relationship forming the joint.

It will be further seen that the load-bearing surfaces on the tongue and along the tongue-receiving slot are of predetermined configuration providing a seated relationship giving maximum rigidity to the joint.

It will be further seen that one form of the joint structure includes a tongue and a slot with lateral load-bearing surfaces having convex and concave central portions, respectively, and horizontal outer edge of portions which mate with each other in seated relationship to provide maximum load distribution across the engaging or abutting lateral surfaces for minimizing lateral movement and shear forces between the supported and supporting member.

It will also be seen that the tongue provided on one of the members extends in longitudinal spaced divergent relationship relative to the member on which the tongue is formed and has a lateral load-bearing surface portion at the juncture of the tongue with the member facing in the direction of the free end of the tongue.

It will additionally be seen that means for locking the supported member against disengagement from the supporting member is provided by a locking slot in the supported member receiving a retainer extending through an aligned tongue-receiving slot in the supporting member to prevent movement of the supported member relative to the supporting member.

It will also be seen that one embodiment of the joint structure includes supported and supporting members, one of the members having a plurality of longitudinally spaced aligned tongues and the other of the members having a plurality of longitudinally spaced aligned tongue-receiving slots, each tongue and tongue-receiving slots having load-bearing lateral surface portions of predetermined irregular configurations.

An alternative form of joint structure 80 embodying the invention and illustrated in FIGS. 9–12 is identical to the joint structure 20 in all respects other than the configuration of the tongues in the supported bracket and the slots in the supporting column. The joint 80 includes a supported bracket 81 having a front plate 81a and a sideplate 81b secured on the end of a horizontal shelf support member 24 and having a tongue 82 formed integral with its front plate 83 for engagement in a tongue-receiving slot 84 provided through the front panel or web 85 of a channel-shaped supporting column 90. The bracket 81 and the support column 90 are identical to the bracket 21 and the column 22, respectively, in all respects other than the shapes of the tongue and tongue slot.

The tongue 82 includes a downwardly tapered body portion 91 which slopes longitudinally and divergently along the backface 92 of the bracket front plate. The tongue body portion is connected with the bracket plate by a juncture portion 93 having a lower bearing surface including a downwardly protruding angular central bearing surface 94, shown here to be substantially V-shaped, sloping downwardly and rearwardly between substantially horizontal lateral side bearing surfaces 95. The top surface of the tongue juncture 93 conforms to the shape of the bottom surface having a central angular depression or recess 100, shown as V-shaped, between lateral horizontal side surfaces 101. The process of forming the tongue in the irregular configuration described reduces the width of the tongue juncture portion slightly when the V-shaped portion of the juncture is formed. The cutting of the tongue along its side and bottom edges from the front plate of the bracket leaves a slot 102 in the bracket front plate. The bracket front plate is provided with a locking recess 103 above the tongue 82 to receive the retainer 32 for releasably locking the supported bracket on the supporting column after the tongue 82 is supportingly engaged through the tongue-receiving slot 84.

The tongue juncture bearing surfaces 94 and 95 on the underside of the juncture portion 93 are shaped complementary to and to seat with the upwardly facing bearing surfaces along the lower edge of the slot 84, including the central angular or V-shaped recess 96 between the joining horizontal lateral edge surfaces 97. The side edges of the slot 84 are formed by substantially vertical lower edge surface portions 104 which join upwardly divergent edge surface portions 104a. The top of the slot is defined by a horizontal edge surface 105 between the top ends of the side edge surfaces 104a.

The procedures of assembling, releasably locking, unlocking, and disassembling the joint 81 are accomplished in exactly the same manner as already discussed with the respect to the joint 20. When the bracket 81 is in supported relationship with the column 90, the tongue 82 projects through the tongue-receiving slot 84 extending downwardly along and divergently from the backface of the front panel of the column. The central lower V-shaped bearing surface 94 of the tongue juncture portion seats in the upwardly facing central V-shaped lower edge supporting surface 96 of the slot 84 while, similarly, the lateral lower side bearing surfaces 95 of the tongue juncture portion seat on the upwardly facing lateral lower side horizontal edge supporting surfaces 97 of the tongue slot. The juncture portion width laterally is slightly less than the distance between the divergent upper side edge surfaces 104a and closely fits between the lower vertical side edge surfaces 104 along the sides of the slot 84, to facilitate entry and provide a relatively tight fit of the tongue in the slot. The retainer 32 is disposed through the locking slot 103 and the slot 84 with its body portion 72 and foot portion 73 extending downwardly in overlapping relationship over the backface of the tongue 82 so that the bracket may not be lifted upwardly due to the wedging action of the offset portion 71 of the retainer between the lower edge surface of the locking slot 103 and the upper edge surface 105 of the slot 84 in the column front panel. The load-bearing support provided by the seated relationship between the lower lateral load-bearing surfaces of the tongue juncture with the upwardly facing lower lateral load-bearing edge surfaces of the slot distributes the load from the bracket to the column without concentration of the load at points which would create shear forces tending to tear the material of both the tongue and the front panel of the supporting column. Obviously, as in the form first described, a plurality of longitudinally spaced and aligned tongues and tongue-receiving slots may be formed in the supported bracket and supporting column, as desired, for distributing the weight over any desired number of tongues and slot surfaces for maintaining the load distribution over the load-bearing surfaces at a desired safe level. As in the case of the joint 20, the firm seated relationship between the tongue and slot load-bearing surfaces together with the relatively tight fit between the juncture portion of each tongue and the lower portion of each tongue receiving slot and the rigidity in the juncture portion resulting from the arcuate or angular central portion, provides a joint of maximum rigidity and load distribution.

It will be readily apparent that a number of variations may be made in the joint structure within the scope of the invention. While three tongues are shown on the bracket 21 for supporting the bracket on the column 22, the number of tongues may vary depending upon the nature of the material of which the bracket and column are formed and the weight of the load supported on the bracket. The greater the number of tongues on a bracket the greater the distribution of load over the load-bearing surfaces so that the load concentration is reduced as the number of tongues is increased. It will also be evident that while in the joints illustrated and described herein the tongues are on the supported bracket and the tongue-receiving slots are in the supporting columns, the tongues may be on the supporting members with the slots in the supported members. In such a modified structure the tongues extend outwardly and upwardly from the front face of the supporting column while the tongue-receiving slots are inverted from the positions illustrated in the accompanying drawings so that the load-bearing edge surfaces of the slots face downwardly to cooperate with the upwardly facing load-bearing surfaces on the tongue juncture portions.

It will also be apparent that holes may be provided in such portions of the structure as the side panels 42 of the columns 22 and 35 of the bracket 21 to function for both weight reduction and for assembly purposes such as bolting the braces 26 and 27 with the column 22.

It will now be seen that an alternate form of structural joint embodying the invention includes a tongue on one member of the joint having a juncture portion provided with a bearing surface having an angular central or V-shaped bulge or protrusion between the horizontal side surfaces providing a rigid juncture section, and a tongue-receiving slot on the other member of the joint having a lower bearing surface defined by a complementary angular central or V-shaped recess between laterally extending horizontal side surfaces upon which the load-bearing surfaces of the tongue juncture section seat when the bracket is coupled with the column to form the joint.

The foregoing description of the invention is explanatory only, and changes in the details of the construction illustrated may be made by those skilled in the art, without departing from the spirit of the invention.

What is claimed is:

1. A structural joint including: means providing a supporting member; means providing a supported member; load-supporting tongue means on one of said members; slot means on the other of said members providing a load-bearing surface; said load-bearing surface having a central recess portion between substantially planar side surface portions; said tongue means having a protruding central surface portion between substantially planar side surface portions complementary to said central recess portion and planar side portions of said loading-bearing surface and mating therewith when in juxtaposition; said slot means having side edge surfaces extending vertically parallel to each other from the outer ends of said planar surface portions and divergent side edge surfaces spaced from said planar surface portions of said load-bearing surface; means providing a locking slot in said one of said members spaced from said tongue means and aligned with the end of said slot means of said other of said members opposite said load-bearing surface; and retainer means removably disposed in said locking slot and said slot means and engaging adjacent portions of both said members for releasably locking said members against detachment from one another.

2. A structural joint as defined in claim 1 wherein said retainer means includes means at its opposite ends providing lateral extensions on each side of said retainer means at each end thereof of greater width than the width of the locking slot in said one member and the width of the slot means in said other member, said lateral extensions preventing accidental disengagement of said retainer means from said locking slot and said slot means.

3. A joint structure as defined in claim 2 wherein said retainer means is insertable into said locking slot and said slot means by insertion of one lateral side extension at one end into said slots and moving said retainer means laterally of said locking slot and slot means until the other of said lateral side extension at said end can be swung through said locking slot and slot means.

4. A structural joint defined in claim 1 wherein said one member includes a plurality of said tongue means in longitudinally aligned spaced relationship and said other member has a plurality of said slot means in longitudinally aligned spaced relation for receiving said tongue means of said one member as said joint is assembled.

5. A structural joint as defined in claim 1 wherein said recess portion is concave and said protruding portion is convex.

6. A structural joint as defined in claim 1 wherein said recess portion of said load-bearing surface is angular in cross section and said protruding portion of said tongue means is complementarily angular in cross section.

7. A structural joint as defined in claim 6 wherein said recess portion of said load-bearing surface is V-shaped in cross section and said complementary protruding portion of said tongue means is V-shaped in cross section.

8. A structural joint between at least two members comprising: a supported member; a supporting member for supporting said supported member in releasable relationship; a first of said member having a tongue formed integral therewith and including a body portion extending in longitudinal substantially parallel relationship with said first member and spaced from a face thereof and having an integral juncture portion joining said body portion with said first member, said juncture portion having a load-bearing surface extending laterally of said tongue and on the surface of said juncture portion facing toward the free end of the body portion of said tongue; the second of said members being provided with a tongue-receiving slot having one end defined by lateral load-bearing surface disposed for engaging said load-bearing surface of said tongue juncture portion when said first and second members are assembled; said load-bearing surface of said juncture portion of said tongue and said load-bearing surface of said slot being complementary in configuration and extent and adapted to mate along their full lengths; the side edges of said slot adjoining the lateral ends of the load-bearing surface thereof extending perpendicular thereto and parallel to each other and engaging the side edges of the juncture portion of the tongue, said side edges spaced from said load-bearing surface being divergent toward the opposite end of said slot; a locking slot in said first member spaced from and extending parallel to the juncture portion of said tongue and disposed on the side of said tongue opposite the free end thereof and in alignment with the enlarged end of said slot in said second member; and a retainer member disposed in said locking slot and said tongue-receiving slot and engaging the adjacent portions of said first and second members for releasably locking said members against disassembly.

9. A joint structure as defined in claim 8 wherein one of said load-bearing surfaces has a central protruding portion and the other of said load-bearing surfaces has a central recess portion complementary with and adapted to mate with said protruding portion of said one of said load-bearing surfaces.

10. A joint structure as defined in claim 9 wherein said central protruding surface portion is convex and said central recess surface portion is concave.

11. A joint structure as defined in claim 10 wherein said load-bearing surfaces include substantially planar lateral side portions on each side of said concave and said convex central load-bearing portions.

12. A structural joint as defined in claim 9 wherein said central protruding surface portion is angular and said central recess surface portion is angular and complementary to said protruding surface portion.

13. A joint structure as defined in claim 12 wherein said central protruding surface portion is V-shaped and said central recess surface portion is V-shaped and complementary to said protruding surface portion.

14. A joint structure as defined in claim 13 including lateral planar side load-bearing surface portions on either side of said V-shaped central load-bearing protruding and recess surface portions.

15. A joint structure for joining a bracket and a column for providing a releasable supporting connection between said bracket and said column comprising: a bracket having a longitudinal plate adapted to be disposed along said column; a plurality of tongues formed on said bracket plate in a longitudinally spaced relationship, each of said tongues having a body portion extending longitudinally of said plate in spaced substantially parallel relationship thereto and a juncture portion integrally connecting said body portion with said bracket plate, said juncture portion providing a downwardly facing load-bearing surface extending laterally of said tongue facing in the direction of longitudinal extension of said body portion of said tongue, said load-bearing surface on said tongue juncture portion having a central protruding surface portion and substantially planar side lateral surface portions on opposite sides of said central protruding portion extending substantially perpendicular to the longitudinal axis of said body portion of said tongue and said bracket plate; and a supporting column having a panel portion provided with a plurality of longitudinally aligned spaced slots, said slots being disposed to receive said tongues on said bracket and each having an upwardly facing load-bearing edge surface at its lower end disposed to be engaged with said load-bearing surface on the one of said tongues mating therewith when said bracket is coupled with said column, said load-bearing surface being disposed substantially perpendicular to the longitudinal axis of said column and being substantially complementary in configuration to said load-bearing surface on said tongue and having a central receiving portion and substantially planar lateral portions seating with and conforming to said tongue load-bearing surface; each of said slots having lower parallel vertical side edge portions adjoining the outer ends of the planar lateral portions of the upwardly facing load-bearing surface and engaging the side edges of the juncture portion of the tongue disposed in said slot, the upper portions of said side edge portions of said slots being divergent toward the upper end of the slot to facilitate entry of the tongues into said slots; a locking slot in said plate of said bracket spaced above and extending parallel to the juncture portion of one of the tongues on said bracket and disposed with its upper transversely extending edge surface in substantial alignment with the upper end edge of the column slot in which the tongue below said locking slot is mated; and a retainer member disposed in said locking slot and in the aligned upper end portion of the tongue-receiving slot in the column and engageable with said upper end portion of said tongue-receiving slot for releasably locking said bracket plate to said column panel.

16. A structural joint as described in claim 15 wherein said bracket is formed on a horizontally extending supported member and said column is a vertically extending supporting member.

17. A structural joint as described in claim 20 wherein said retainer member comprises an upper transversely elongate front bar; a rearwardly extending offset portion of a width narrower than said front bar and substantially the width of said locking slot; an elongate downwardly extending tapered body portion; and an enlarged foot portion at the lower end of said body portion having a laterally projecting portion on each side of said body portion of a length which combined with the width of the lower end of the body portion is less than the width of the locking slot, the total width of said foot portion being greater than the width of said locking slot.

18. A structural joint as defined in claim 17 wherein one laterally projecting portion of said foot portion of said retainer member is insertable through said locking slot and said tongue-receiving slot and the adjacent lower end of the body portion of said retainer is movable laterally of said slots to engage the adjacent side edges thereof and is then movable in the plane of said slot to swing the opposite laterally projecting portion of said foot portion to be moved through said slots, the offset portion of said retainer member then being engageable with the lower edge of said locking slot with the front bar engaging the bracket plate.

19. A structural joint as defined in claim 15 wherein said protruding load-bearing surface portion on said tongue juncture is convex and said central recess of said load-bearing surface portion of said slot is complementary concave surface.

20. A structural assembly comprising: a plurality of substantially horizontal spaced supported members; a plurality of substantially vertical spaced load-supporting columns; each of said supporting columns having a plurality of longitudinally spaced aligned tongue-receiving slots, each of said slots having a lower edge defined by a laterally extending load-bearing surface of predetermined nonlinear configuration; each of said supported members having tongue means connected therewith extending longitudinally of said supported members and having a body portion spaced therefrom and a juncture portion connecting said tongue with said supported member, said juncture portion having a laterally extending load-bearing surface of nonlinear configuration complementary to the said load-bearing surfaces of said tongue-receiving slots for seating on said slot surfaces to support said supported members and distribute load forces from said supported members on said columns minimizing shear forces between said supported members and said columns; a locking slot in each of said supported members disposed to align with a tongue-receiving slot in said column with which said supported member is connected; and a retainer member removably disposed in said aligned locking slot and tongue-receiving slot and having rigid laterally extending means at its opposite ends for releasably retaining said retainer member engaged in said slots to releasably lock said supported members to said columns, each said means being of a total lateral dimension greater than the largest dimension of said slot.

21. In an adjustable rack having upright column members formed with longitudinally spaced tongue-receiving slots and horizontal supported members having at each end thereof a connecting bracket connectable to the upright column members by means of complemental tongue members carried by said brackets which engage with a sliding fit in a corresponding member of tongue-receiving slots in said column members, each bracket having a laterally elongate locking slot formed therein spaced from said tongue members and registering with one of the tongue-receiving slots in the upright column member when the bracket is connected thereto, a retainer member insertable into said locking slot and the registering tongue-receiving slot for locking said horizontal supported members against accidental disconnection with said column members, said retainer member comprising: an elongate tapered body portion; an offset portion at the large end of the body portion having a width substantially equal to the lateral length of the locking slot; a substantially planar bar portion connected to the offset portion at the end thereof opposite the body portion and having a lateral dimension greater than the lateral length of the locking slot; and a foot portion at the smaller end of the body portion and having lateral portions disposed in the plane of said body portion and projecting laterally beyond said body portion, each lateral portion and the adjacent smaller end of the body portion being less in width than the lateral length of the locking slot whereby one lateral projecting portion of said foot portion may be inserted through said locking slot and adjacent body portion swing in the slot to move the opposite lateral projecting portion of said foot portion through said locking slot and the body portion moved longitudinally of its tapered length through said slot to dispose the offset portion of said retainer member in said locking slot and aligned tongue-receiving slot with the bar portion engaging the bracket, the total lateral width of the smaller end of the body portion and the laterally projecting portions of the foot portion being greater than the lateral length of the locking slot whereby the retainer member must be swung laterally in said locking slot to swing the lateral projections of said foot portion through said locking slot to release the retainer member, thereby locking the upright column member and the horizontal supported member against accidental disconnection.

22. A retainer member of the character set forth in claim 21 wherein: the elongate tapered body portion and the enlarged foot portion at the smaller end thereof have a weight greater than the planar bar portion, whereby when the retainer member is positioned in the locking slot with the offset portion thereof engaged in said locking slot the body portion moves by gravity to swing downwardly substantially parallel to the column member and engage the adjacent tongue, and the planar bar portion is swung to engage the bracket, whereby the supported member is releasably locked to said column member.

33. A structural assembly comprising: a plurality of substantially horizontal spaced supported members; a plurality of substantially vertical spaced load-supporting columns; load-supporting tongue means on one of said members; slot means on the other of said members providing a load-bearing surface; said load-bearing surface having a central recess portion between substantially planar side surface portions; said tongue means having a protruding central surface portion between substantially planar side surface portions complementary to said central recess portion and planar side portions of said loading bearing surface and mating therewith when in juxtaposition; said slot means having side edge surfaces extending vertically parallel to each other from the outer ends of said planar surface portions and divergent side edge surfaces spaced from said planar surface portions of said load-bearing surface; means providing a locking slot in said one of said members spaced from said tongue means and aligned with the end of said slot means of said other of said members opposite said load-bearing surface; and retainer means removably disposed in said locking slot and said slot means and engaging adjacent portions of both said members for releasably locking said members against detachment from one another.

* * * * *